US008543424B2

(12) United States Patent
Hunsaker

(10) Patent No.: US 8,543,424 B2
(45) Date of Patent: Sep. 24, 2013

(54) VEHICLE INSURANCE STATUS DISPLAY SYSTEM

(76) Inventor: Darryl Mark Hunsaker, Columbia, MO (US)

( * ) Notice: Subject to any disclaimer, the term of this patent is extended or adjusted under 35 U.S.C. 154(b) by 1910 days.

(21) Appl. No.: 11/647,665

(22) Filed: Dec. 29, 2006

(65) Prior Publication Data

US 2007/0151133 A1 Jul. 5, 2007

Related U.S. Application Data

(60) Provisional application No. 60/755,729, filed on Dec. 30, 2005.

(51) Int. Cl.
*G06Q 40/00* (2012.01)

(52) U.S. Cl.
USPC .............................................................. 705/4

(58) Field of Classification Search
USPC .............................................................. 705/4
See application file for complete search history.

(56) References Cited

U.S. PATENT DOCUMENTS

| | | | | |
|---|---|---|---|---|
| 3,487,567 | A | 1/1970 | Waybright | |
| 4,184,276 | A | 1/1980 | Hernandez | |
| 4,695,077 | A | 9/1987 | Pretre | |
| 5,325,291 | A | 6/1994 | Garrett et al. | |
| 5,502,912 | A | 4/1996 | LeBoff et al. | |
| 5,634,670 | A | 6/1997 | Orensteen et al. | |
| 6,233,563 | B1 | 5/2001 | Jefferson et al. | |
| 6,258,200 | B1 | 7/2001 | Kassab | |
| 6,275,157 | B1 | 8/2001 | Mays et al. | |
| 6,299,213 | B1 * | 10/2001 | Souparis | 283/81 |
| 6,437,690 | B1 | 8/2002 | Okezie | |
| 7,398,220 | B1 * | 7/2008 | Hayes | 705/4 |
| 2005/0283388 | A1 * | 12/2005 | Eberwine et al. | 705/4 |

* cited by examiner

*Primary Examiner* — Jessica Lemieux

(74) *Attorney, Agent, or Firm* — Klotzer Patents; Daniel Klotzer

(57) ABSTRACT

A Vehicle Insurance Status Display System (VISDS) method and system of providing readily perceivable access to selected key information regarding the insurance status of a vehicle. The VISDS provides an at least partially symbolized representation of the germane informational content of a vehicle owner's manner of insuring that vehicle in accordance with the relevant laws of the relevant jurisdiction that the vehicle is registered in. The at least partially symbolized representation is prepared in the form of a display for exhibiting on the vehicle. The manners of symbolizing utilize perception facilitating modes to enhance the readiness of perception of the selected key information, and in particular the germane informational content of the insurance status date for that vehicle, which is the date through which the vehicle is properly insured.

20 Claims, 5 Drawing Sheets

VEHICLE INSURANCE STATUS DISPLAY SYSTEM

CROSS-REFERENCE TO RELATED APPLICATIONS

This non-provisional patent application claims the benefit of priority from U.S. provisional patent application Ser. No. 60/755,729, inventor Hunsaker, Darryl Mark, filed on Dec. 30, 2005.

STATEMENT REGARDING FEDERALLY SPONSORED RESEARCH OR DEVELOPMENT

Not applicable.

BACKGROUND OF THE INVENTION

1. Field of the Invention

The present invention includes systems and methods that relate generally to means of providing car insurance status information and more specifically to means of displaying information that relates to the insurance status of a vehicle so that said status can be comprehended promptly and accurately, as well as providing capabilities of comprehending said status information at a remove from the vehicle.

2. Related Art

Motor vehicles driven on public roads in the United States are generally required to be insured by their owners for damages or injuries that may be caused by that vehicle's operation. Liability insurance is mandatory in 47 states and the District of Columbia. New Hampshire, Tennessee and Wisconsin do not have mandatory insurance laws. According to the Insurance Institute, approximately 14% of the motorists in the U.S. do not carry insurance. Some studies have resulted in estimates that the actual percentage is closer to 20%. In some metro areas, the percentages can even be greater than 50%. Approximately 6% of the cost of a vehicle insurance premium paid by the average vehicle owner is due to uninsured motorists. A system for regulating and enforcing these requirements have been instituted by the governments of the states, but these systems do not yet operate optimally. It is well known that there is significant room for improvement in this area. Several states have tried a database approach with limited degrees of success due to problems with high error rates. This approach is also very costly since it requires every insurance carrier to comply (some do or will not) and because the database system needs to be updated on a daily basis to maintain an acceptable measure of accuracy. In March of 2005, the Missouri State Auditor, Claire McCaskill, released a report titled "Efforts to Enforce Uninsured Motorist Law". The report detailed that motorists in Missouri are required to carry "uninsured motorist" coverage to compensate for the numbers of motorists that do not comply with the insurance requirements. For the average motorist the cost of the uninsured motorist coverage is estimated in this report to be $23.00 per vehicle annually, costing about $90 million annually for just the state of Missouri, which is not even one of the 10 most populous states in the U.S. The report also suggests a budget request for approximately $8.2 million to initiate a system for monitoring insurance companies and motorists to reduce the number of uninsured motorists. Just paying for such a system is also problematic given the budget constraints most state governments are coping with. Additionally, the uninsured motorist coverage that policy holders (often by state mandate) pay extra for generally covers only bodily injury (normally with a small limit) and does not provide any coverage for property damage. A reduction in the number of uninsured motorists would help to reduce some of this burden placed upon those motorists that do abide by the regulations.

One major impediment to more effective administration and enforcement of these insurance laws are difficulties in monitoring the current actual insurance status of vehicles. While there may be some variations in detail among the various states, certain aspects are relatively common among them. At present, motorists receive a proof-of-insurance ID card when they sign up for an insurance policy, and they are usually required to present this insurance card to a police officer when requested. However, the status indication and expiration date on the card may have been accurate when the card was issued, but may no longer be correct by the time the officer sees the card. Insurance policies can often be paid for over time, with the printed information on the card reflecting the expiration date for the policy if it were to be fully paid for. When the motorist does not continue with the payments, or simply cancels the policy, the officer will not know from looking at the card that the motorist is actually no longer insured. Also, unless an officer conducts such an investigation of a vehicle and motorist, there is no way for the officer to readily determine whether or not a given vehicle passing by even has a card indicating that a policy was issued for that vehicle, outside of the question of whether or not that policy is still in effect.

The issue of how to provide a law enforcement officer ready access to relevant vehicle information by visual inspection is germane to vehicle license plate design as well. But there are also significant differences between the requirements for providing ready visual access to license plate information and the requirements that are relevant to insurance status information. The license plate is issued by the state, and no other manner of procuring license plates is available. The state can specify the term, contents, and design of the plates, and it is not possible to get a set of plates (or renewal decal) for any period other than those specified by the state, nor is it possible to get the vehicle plates or renewal for a partial term or on a payment over time status (the payments for which being possibly discontinued prior to completion). Additionally, the license plates are designed with the primary purpose of providing a unique identifying label to each vehicle that is always available for ready access by visual inspection. It is also important for an officer to be able to recognize the plate number from at least a certain distance, and in a short period of time, when circumstances dictate. Hence, the license plate number (and letters or symbols) dominates the design of the plates both in prominence and placement, and the expiration information is given a secondary display status. By contrast, insurance policies are provided by private parties, they are variable in their terms and specifications, and they can be procured even though the term indicated may not have been fully paid for.

The pertinent insurance information that a police officer might need is provided on the aforementioned insurance ID cards, but an officer can generally only access this information if the driver is stopped for some other reason. When the driver is unavailable, or the vehicle is parked, an officer usually cannot access the pertinent information. Placing the insurance card information in a place of constant prominence, such as a vehicle window, could provide access to the information at all times, but will also present other difficulties. Among these difficulties is the inability, with normal vision, to be able to read this information from any significant distance, due to the need to arrange a substantial amount of insurance information upon a small card. Since the police officer's purpose is chiefly to ascertain whether or not the vehicle is properly insured, the majority of this information is unnecessary. In addition, the insurance card includes a significant amount of personal information that would not be advisable to make available to any passerby. There exists then, an unmet need for a means to provide law enforcement personnel with ready access to the insurance status of a vehicle. This means of ready access should be intelligible quickly and accurately from a specified distance (such as the distance that typically separates two vehicles in traffic), and will preferably not provide unnecessary details or unrelated personal information.

SUMMARY OF THE INVENTION

In accordance with the above described problems and constraints on the possible solutions, the present invention is a system and method of providing upon a vehicle ready visual access to the insurance status of that vehicle.

Among the key attributes of the present invention are its capabilities of providing a law enforcement officer with constantly ready access and rapid recognition of a vehicle's pertinent insurance status information. Related attributes of the present invention are it's capabilities of enabling this rapid recognition of insurance status information when a law enforcement officer is at a specified distance such as is typical when the officer is driving in traffic behind the vehicle in question. An insurance status indicator, such as a decal, according to the present invention will routinely be disposed in a specified location on the vehicle, such as upon the lower right or left corner of the front and/or rear vehicle windshields. Of course, if there was no other consideration than ensuring that an officer could easily read the pertinent information, the decal could be simply made as large as the windshield. Since that is clearly impractical, it is necessary to balance the need to provide relatively unobstructed vision through the vehicle glass against the need to make the information on the decal as readily visible as possible. The larger the size of the decal, the larger, and hence the more easily read, can be the display of the information on the decal. Thus, a problem solved by the present invention is how to present the crucial insurance status information in a form that is quickly and accurately recognized, even from some distance, while avoiding the need to obscure more than a minimal amount of the window glass. The present invention is not only suitable for display upon a vehicle window, however. Certain embodiments of the system of the present invention are adapted for flexible deployment, and can be affixed to a bumper, a license plate, or practically any portion of a vehicle's exterior. Though the majority of the description herein of the Vehicle Insurance Status Display System (referred to hereafter as VISDS) is focused on displaying the status information in a vehicle's window, this is not limiting of the available means of disposing the present invention, and it is within the scope of the present invention to dispose the VISDS on any portion of a vehicle that is visible from the exterior of the vehicle. For example, the balancing issue between larger display size and lesser vehicle obscuring is also germane when disposing the status information decal on a car's license plate or a portion of its body material.

Research into human perception and performance has been utilized to solve the problem of maximizing the ease and speed of recognition of the insurance status information while curtailing the undesirable effects of increasing decal size. The specific area of research into human perception and performance that is of principal concern here are investigations of display factors and the effects of those display factors on a person's ease and speed of recognition (also referred to as reaction time or RT) of the information in that display. Among the factors that are potentially significant are:

1. Characteristics of the overall display, such as size, shape, overall arrangement, or location of the display's disposition;
2. Characteristics of the ways in which the information in the display is symbolically depicted, such as whether text or graphical symbols are utilized;
3. Variations in the ways in which the information in the display is physically depicted, such as differences in text size or symbol colors, or specific placement locations (within the overall display arrangement) of specific categories of information; and
4. Aspects of the relationships between the various parts of the information in the display, such as text density or types of associations between differing forms of information content.

One of the foremost organizations concerned with studying aspects of how people perform in various situations is the Human Factors and Ergonomics Society (referred to hereafter as HFES). As stated on the HFES website (home page url: http://www.hfes.org/Web/Default.aspx) in the section titled "about HFES": "The Society's mission is to promote the discovery and exchange of knowledge concerning the characteristics of human beings that are applicable to the design of systems and devices of all kinds." The HFES maintains a "directory of human factors/ergonomics (HF/E) consultants and expert witnesses", which is a compendium of various specialists whom more than qualify as those of skill in the art, in their respective areas of specialization. One of these listed consultants and expert witnesses is James R. McCracken, Ph.D., who is listed as, among other things, an "Expert in the neurological and physiological bases of cognition." According to Dr. McCracken, a landmark 2-volume reference in the field is the "Handbook of Human Perception and Performance" (referred to hereafter as HHPP), editors Kenneth R. Boff, Lloyd Kaufman, and James P. Thomas, New York: Wiley, 1986. Volume 1 of the HHPP addresses "Sensory processes and perception", while Volume 2 addresses "Cognitive processes and performance". Of particular relevance to the issues the present invention contends with is the focus of volume 2, Chapter 30: "Motor Control". One of these issues is a factor termed "decision time" which is defined in p. 30-3, col. 1 as "decision processes, . . . measured by reaction time, which is defined as the time from onset of a signal calling for response until the beginning of responses." A variety of influences on reaction time are discussed, including the observation in p. 30-4, col. 2 that "In general, reaction time increases whenever the number of possible stimuli and responses that are appropriate for some situation increases." In the case of the insurance decal the stimuli would be the information signifiers, such as numbers or symbols, that are present on the decal. This research observation demonstrates that research has confirmed the common experience that the more items necessary to search through, the longer it will take to make the required reaction. Hence, the performance of the decal, in terms of ease and speed of recognition by an observer, is enhanced by limiting the number of stimuli present to those that are required for the performance of its function. The significance of this benefit of the present invention is further verified in the HHPP (also on p. 30-4, col. 2) with the further observation that "Reaction time increases linearly with the logarithm of the number of choices". This point is reiterated by Donders, F. C. (On the speed of mental processes); from "Attention & performance II", W. G. Koster (ED. & Trans.), Amsterdam: North Holland, 1969, and again related in the HHPP in p. 30-5, col. 1: " . . . Reaction time has been known to increase markedly when more than one signal and response can occur in a given setting."

Reaction time to a display is also affected by other characteristics. One such factor was investigated by S. W. Keele in an article titled "Effects of input and output modes on decision time" in the J. Exp. Psych., 85, 157-164, 1970. As summarized in the HHPP: "Keele (1970) presented either colors or shapes as stimuli, and subjects responded by pressing keys . . . . Reaction time appears to depend both on the number of stimuli and the number of responses." This research by Keele addresses the issue of how choices in the amount and forms of information display can impact reaction time, as well as effects upon an observer's reaction time that relate to requiring the observer to be capable of multiple responses to at least one aspect of the display. Embodiments of the VISDS apply Keele's research insights for formulating display strategies capable of optimizing performance while accounting for the assorted constraints that influence these displays.

Chapter 28 of the HHPP is entitled: "Visual Information Processing", and as related on p. 28-2: "This chapter is devoted to an information-processing analysis of visual perception." Of particular relevance to the present invention is section 2 of Ch. 28, entitled: "Visual search", described as: "This section reviews information-processing studies of visual search and visual processing of displays . . . . " This section is of obvious significance to the VISDS since a critical task that the present invention is designed to facilitate is the visual search of a display, and the processing of the information contained in that display. The HHPP, on p. 28-25, in reference to a research article by Ellis, S. H. & Chase, W. G., titled: "Parallel processing in item recognition" that appeared in Perception & Psychophysics, 10, 379-384, 1971 notes: "Ellis & Chase (1971) have suggested that feature comparisons and item comparisons . . . can be conducted in parallel." The HHPP then goes on to further convey that: "The interesting result of this study was that subject could reject nontargets on the basis of a physical feature faster than they could on the basis of a memory search only if the target set was large; for small target sets (one or two items) memory search was faster than a physical feature test". In other words, if an observer of the display needed only to distinguish among one or two targets, that observer could determine more quickly based solely on memory (by comparison to discriminating by physical feature) what was the target of the visual search of that display. But, if the number of possible targets that required scrutiny were more numerous, then the observer would discriminate more quickly on the basis of a physical characteristic of the target. Various embodiments of the VISDS include alternatives that employ designs which utilize these observer targeting dynamics to provide reduced recognition time capabilities. In certain circumstances, such as when a police officer is only judging whether or not a particular vehicle has up-to-date insurance and that vehicle is from the state where the officer has jurisdiction, the officer could work quickly from memory of the familiar display layout to find the appropriate information. Displays according to the present invention will customarily have layouts that are not likely to substantially vary among differing insurance companies, at least within a specific state, and may often have substantially standardized layouts for multiple states, so that officers in one state can efficiently search the insurance displays of another state.

While utilization of the speed advantages available in the memory-based, minimal target number visual search strategy is a significant advantage of certain embodiments of the VISDS, both those embodiments, as well as other embodiments of the VISDS are capable of employing additional means of improving visual search and processing. As cited in the preceding paragraph, in reference to the research of Ellis & Chase (1971), the HHPP quotation further noted that the process of visual target identification can also be facilitated by physical features of the target (or nontarget). These physical features can assume a variety of forms, and differing embodiments of the VISDS can employ differing permutations of these forms of physical features, both separately and in combinations. In addition, since an embodiment of the VISDS often has more than one bit of information to be processed by an observing officer, a single embodiment can vary both the individual forms of physical features, as well as the number of forms of physical features, employed to identify differing aspects of its visual display.

Differing forms of visual target physical features can also differ in the degree of assistance they provide when identifying a target within a visual display. The differences in assistance can be due to varying aspects of the display, the observation conditions, the requirements for success in the observation process, and other factors, even before account is made for differences in how well human perception innately responds to these differing forms. L. G. Williams, in a research article titled: "The effect of target specification on objects fixated during visual search", *Perception and Psychophysics,* 1, 315-318, 1966; explored how differing forms of physical features perform differently for assisting in the speed of recognition of specified targets in a visual display. The HHPP, on p. 28-26 summarized the import of Williams' research by pronouncing:

"Williams (1966) has provided the definitive study on the determinants of eye fixations during visual search. In Williams' (1966) study, subjects searched large cluttered visual display for a form containing a two-digit target number printed on it . . . . The question of interest was whether subjects could use information about a target's size, color, or shape to determine which forms to look at.

"The results shown in tables 2B.3 and 2B.4 are very clear. Subjects could use any color and the largest size to direct their eye movements, but they derived very little benefit from knowing the shape of the object or the size other than the largest size."

The VISDS incorporates the findings of Williams cited immediately above, as well others who have explored the field of how visual display factors affect human perception and performance. Williams' 1966 study provides useful guidance in how to devise a display that can perform optimally in certain circumstances, but its results do not preclude that even those forms of the physical features of visual displays which were found by Williams to provide very little benefit in the circumstances of the 1966 study, such as the shape of an object, could provide significant benefits in the real world circumstances of an insurance display decal according to the present invention. Among the factors that can impact the performance of a particular display, which differs from Williams' setup, is the need for a display to accomplish multiple functions. These functions may be required separately from each other, or may relate in specified manners, such as one function being subordinate to another. An example of a paramount function and a related, subordinate function would be the indication of the expiration date of the insurance status being paramount and the indication of the Vehicle Identification Number (VIN) that confirms that this decal does belong to this vehicle being a subordinate function. The importance of Williams' study is not just that in certain circumstances a target identified by size is preferable to a target identified by shape, but it is also noteworthy that the study indicates in general that not all forms of physical features perform equally well, and hence not all forms of visual displays perform equally well. There are significant performance differences that can be achieved by utilizing differing display methodologies, and the application and optimization of these differing methodologies is one of the principal benefits of the present invention.

The VISDS generally involves configuring a display of information related to the status of a liability insurance policy for a vehicle. The display is generally affixed to the vehicle whose liability insurance policy it contains information regarding. The information within the display can be divided into parts, such as an effective (i.e. start) date, an expiration date, or a vehicle identification number (referred to hereafter as VIN). A part of the insurance status related information can be visually represented in a variety of ways, just as a number can be represented by digits, or by words that are the names of the digits within that number. Among the modes of representation that the VISDS is capable of using for portraying these parts of the insurance status related information are alphanumeric characters, including letters and numbers, that can be arranged into words, abbreviations, letter and number combinations, and other permutations. Other VISDS modes of representation include, but are not limited to: symbols, patterns, pattern contrasts, colors, color contrasts, surface treatments (such as reflectivity or antiglare coatings), foreground vs. background contrasts, shadings and shadows, 3 dimensional appearances and effects, holograms, shapes, sizes, degrees of opacity or transparency, spatial placement (both of various part of the insurance status related information within the display and of the location of the display on the vehicle), encoding (such as bar codes), as well as display content allocation and arrangement techniques.

The present invention encompasses methods and apparatuses, both of which are collectively referred to herein as systems. A display configured according to the VISDS includes at least one indicator element defined as a visually perceivable aspect of the display. Individual indicator elements often contain at least one part of the information that relates to the liability insurance policy for the vehicle. More specifically, at least one of the indicator elements includes at least one part of the information that is central for determining the current status of the liability insurance policy for the vehicle, and such an indicator element portrays that part of the information with a specific type of representational mode defined herein as a perception facilitating mode. A perception facilitating mode of representation of an indicator element is a portrayal of the information within that element that facilitates the perceiving of that information. More than one mode of perception facilitating can be utilized in a single indicator element, a mode of perception facilitating may be utilized for only a portion of an indicator element, and the same mode of perception facilitating can be utilized for more than one indicator element. The particular modes of perception facilitating utilized in individual indicator elements will vary, depending on a number of factors that can include, but are not limited to:

a) The relative degree of significance of the information within the indicator element;
b) The number and arrangement of other indicator elements within the display;
c) The circumstances and constraints of the situations in which the display is being perceived;
d) The relative degree of perception facilitating preferred;
e) The mode of representation of the information within the indicator element and the issues which affect how humans perceive that mode of representation; and
f) The performance, content, and form constraints shaped by external strictures such as state regulations.

Among the novel benefits of the VISDS are its capabilities of employing techniques that apply the results of the visual perception research described previously to address the immediately above listed factors, as well as others, and balance their effects while providing suitable levels of performance. Illustrative examples of the range of techniques (each of which can consist of an individual mode of representation, or combinations of multiple modes of representation) that are capable of being advantageous are:

a) Size differentiation between indicator elements of differing significance, as well as between indicator elements of relatively close proximity of placement within a given display;
b) Standardized placement locations (within a display) of at least one indicator element, or of relative placement locations of groups of indicator elements, that include particular parts of the insurance related information;
c) Assignments to indicator elements of particular colors (characterized by hue, saturation, and/or mixing) to at least one of the foreground, middle ground, or background of that indicator element as well as particular combinations of fore, middle, or background colors for indicating specific parts of the insurance related information contained by that indicator element;
d) Assignments to indicator elements of particular patterns to at least one of the foreground, middle ground, or background of that indicator element as well as particular combinations of fore, middle, or background patterns for indicating specific parts of the insurance related information contained by that indicator element;
e) Assignments of particular shapes to an indicator element that indicates a specific part of the insurance related information is contained within that indicator element;
f) Assignments of particular surface treatments (such as a reflectivity coating to facilitate low-light perception) to indicator elements that contain particular parts of the insurance related information;
g) Further assignments of other VISDS modes of representation, described previously, to indicator elements that contain particular parts of the insurance related information;
h) Limitations on the quantity and nature of both the parts of insurance related information within a given indicator element and of the indicator elements as a group that are in a particular display; and
i) Combinations of the above techniques a) through h).

In general, displays according to the present invention will contain selected quantities of information that relates to the current status of a liability insurance policy for a vehicle. The sum amount of information contained within such a display will usually be limited according to various criteria, these criteria normally including preferences against inclusion of information that is extraneous to determining the status of the liability insurance policy for the vehicle. The display will include at least one indicator element (and often a number of indicator elements) that each contains at least a part of the insurance related information at issue, and those indicator elements will often be portrayed in one or more modes of representation. Certain of these modes of representation are defined herein as perception facilitating modes that are utilized to facilitate perception of the information within an indicator element by varying degrees. The overall configuration of a particular display, the arrangement of indicator elements within that display, the modes of representation of those indicator elements and in particular the indicator elements which contain significant insurance related information and are therefore portrayed in perception facilitating modes combine to provide an observer such as a police officer with a relatively rapid and straightforward recognition of the current insurance status of the vehicle in question. The present invention also provides such an officer with a capability of determining the insurance status from a greater distance than could be accomplished if the insurance card itself were simply to be displayed. The benefits and advantages of the present invention not only include resolutions of the previously described difficulties inherent in the present situation, but will also provide additional advantages due to the potential of preventing other problems from occurring by early identification of those whom are less inclined to be responsible towards their fellow motorists.

Other objects and features will be in part apparent and in part pointed out hereinafter.

DETAILED DESCRIPTION OF THE DRAWINGS

In the following description, identical numbers indicate identical elements. Where an element has been described in one Figure, and is unaltered in detail or relation in any other Figure, said element description applies to all Figures.

Figure 1:
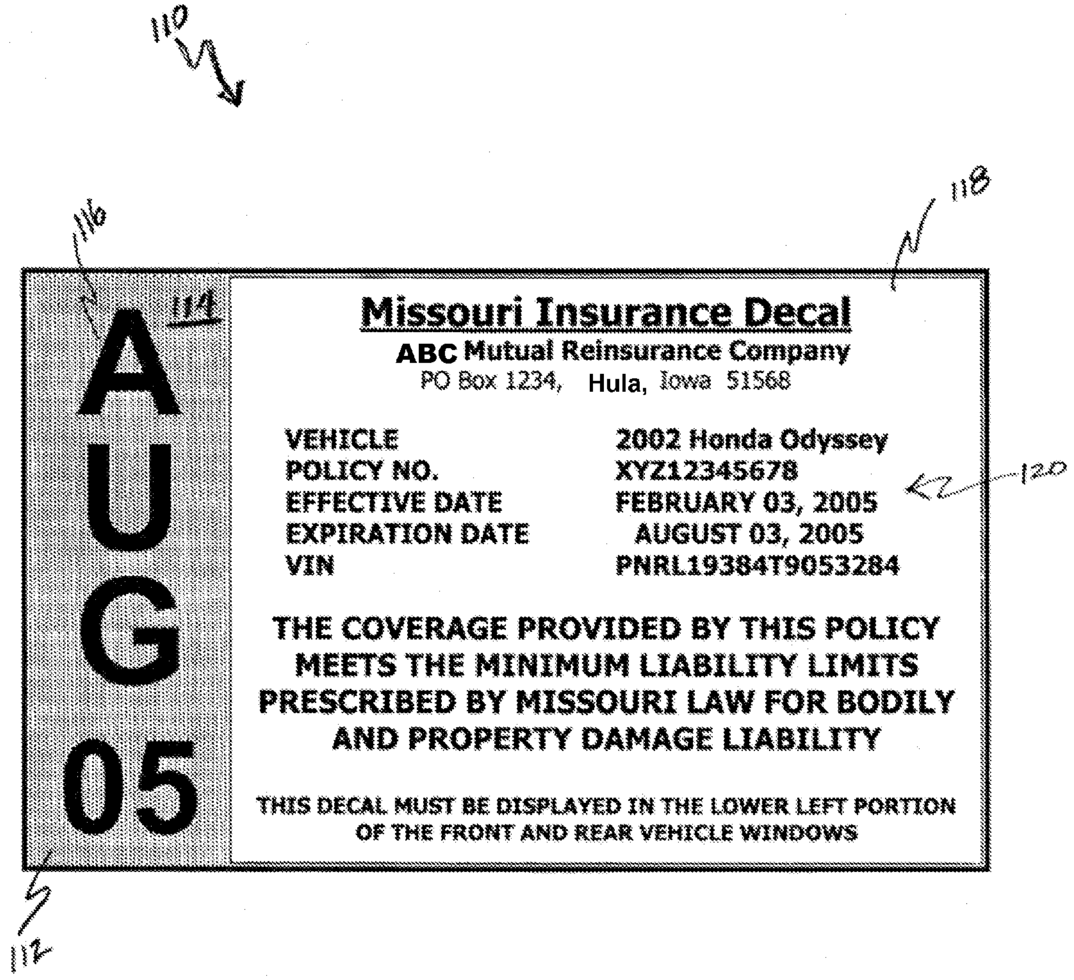
FIG. 1 depicts a first embodiment of a display according to the present invention.

Referring initially to FIG. 1, a first display configuration 110 is depicted. The first display configuration 110 includes a first left border indicator element 112. The first left border indicator element 112 is a vertically disposed rectangular block comprising a background color 114 and a first foreground alphanumeric representation 116 of a part of the insurance related information. The first foreground alphanumeric representation 116 is portrayed in black characters, which contrasts with the first background color 114 to provide a first character-based perception facilitating mode. A second character-based perception facilitating mode is configured by selecting to portray the first foreground alphanumeric representation 116 in a different color (not shown), wherein the different color is selected to provide enhanced optical contrast with the first background color 114, or in an optically active manner such as by using a reflective coating (not shown). The color utilized for the first background color 114 is capable of being selected according to a number of criteria, such as coinciding a color for the month of the insurance policy expiration date with the color used by that state to designate the month of expiration for that state's license plates. The insurance related information in the first left border indicator element 112 is also portrayed in a content-allotment perception facilitating mode that allots only a limited range of content for the first left border indicator element 112, i.e. only abbreviations for the month and year in which the relevant insurance policy expires, thereby speeding up an officer's determination whether or not closer inspection is required. A third character-based perception facilitating mode is also utilized wherein the first foreground alphanumeric representation 116 is portrayed in larger characters than any other aspect of the first display configuration 110. A fourth character-based perception facilitating mode is used as well wherein the characters are configured so that the content is read in two directions, namely an upper, vertically arranged month abbreviation and a lower, horizontally arranged year abbreviation, so that an officer can more rapidly target the specific parts of the insurance related information within the display that are needed.

To the right of first left border indicator element 112 is disposed a text field 118 that comprises the majority of the first display configuration 110. Text field 118 contains the majority of the display's detailed information that relates to the current status of the liability insurance policy for the vehicle, and is both an indicator element as a whole as well as a field that contains smaller separate indicator elements. The configuration of text field 118 is another application of the content-allotment perception facilitating mode that limits the amount of secondary information present within text field 118. In the context of the present invention, secondary information would be information that relates generally to the arena of vehicles, state requirements, insurance policies, and insurance regulations, but does not pertain directly to determining the current status of the insurance policy for the particular vehicle in question, which is referred to herein as primary information. To illustrate, in the first display configuration 110, the abbreviations for the month and year in the first foreground alphanumeric representation 116 are primary information, while the address of the insurance company that underwrites the insurance policy in text field 118 is secondary information. The selective distribution of information to visually distinguished indicator elements, such as primary insurance related information in first left border indicator element 112 and secondary insurance related information in text field 118 is an expression of a content-significance based perception facilitating mode, wherein an officer would know that the most significant insurance related information is found against a color background (though it should be noted that the content-significance based perception facilitating mode is not limited only to color or its lack as a marker of significance, but also encompasses any other means of utilizing a visually distinguishable background for providing an indication of the significance of the content within that background.) Text field 118 is portrayed as black alphanumeric characters on a white (or blank) background. The configuration of the contrast between the first background color 114 and the uncolored background of text field 118 is an expression of a first background-differentiated perception facilitating mode. The observing officer would know that the content of the field colored with first background color 114 is to be considered first, and would not have to take the time to inspect text field 118 also in order to find the first foreground alphanumeric representation 116 that indicates the month and year of the expiration date of the insurance policy for the vehicle. In the case of the first display configuration 110, if the day of the month were relevant to determining the current status of the insurance policy on the day the first display configuration 110 were being observed, the officer would then inspect text field 118 to ascertain that information. First display configuration 110 also utilizes an expression of a first placement-location based perception facilitating mode, wherein the location within a display that a part of the insurance related information is placed indicates the significance of that part of the insurance related information. In the case of the first display configuration 110, the placement along the left side of the display indicates to an observing officer that the most significant current insurance status related information is most readily found there. A second placement-location based perception facilitating mode is utilized in arranging the configuration of the information content within the text field 118, wherein the relative location that a particular part of the insurance related information is placed is a known convention, either within an individual state's prescribed display configuration or between a number of states, so that an observing officer can readily target and inspect a specific part of the insurance related information more readily. In the case of first display configuration 110, the detailed information that identifies the type of vehicle, the specific VIN of the vehicle to confirm the identity of the vehicle that the insurance policy applies to, the policy's effective and expiration dates, and the policy no. are placed in a central text block 120. The other information within text field 118 are exemplary of the additional types of information that may be chosen to be included within a display according to the present invention.

Figure 2:
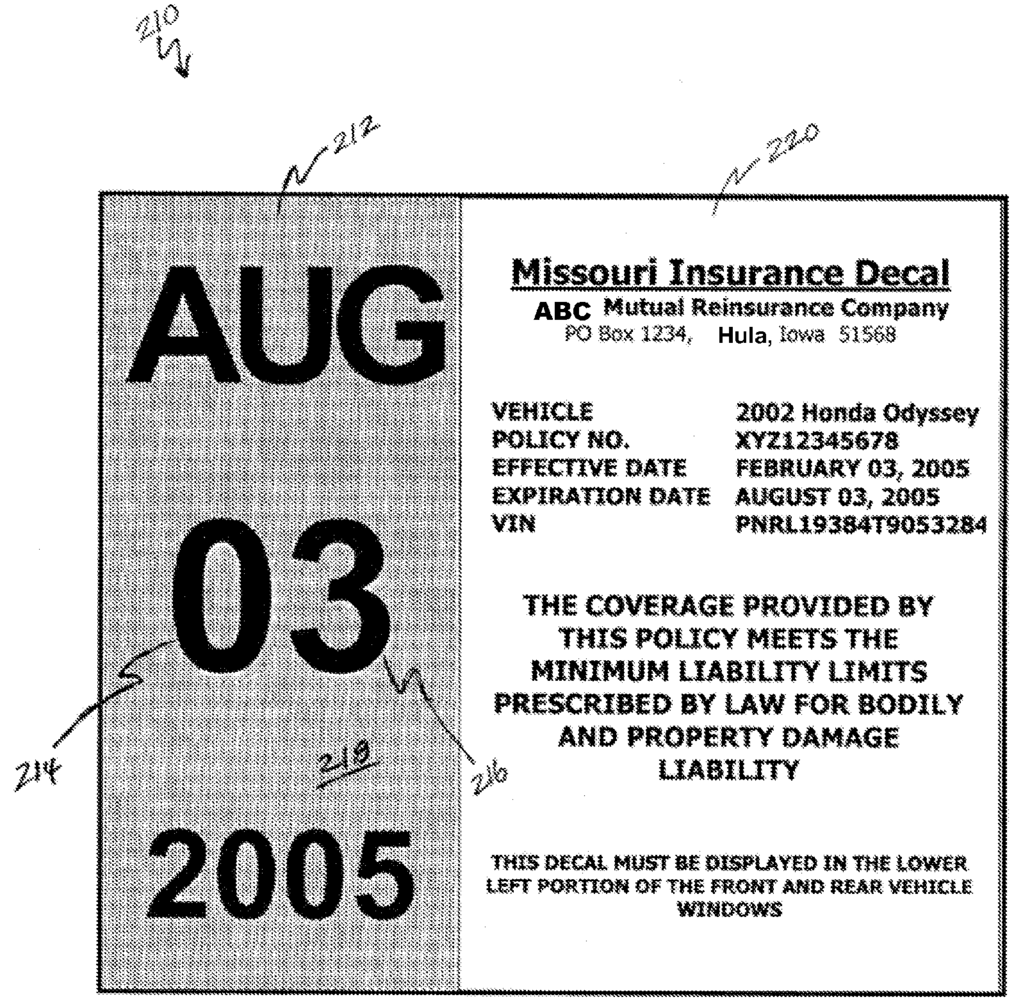
FIG. 2 depicts a second embodiment of a display according to the present invention.

Referring next to FIG. 2, wherein a second display configuration 210 is depicted. The differences between second display configuration 210 and first display configuration 110 are principally due to the differences between first left border indicator element 112 and second left border indicator element 212. First left border indicator element 112 utilizes a plurality of perception facilitating modes including:

- the first character-based perception facilitating mode,
- the second character-based perception facilitating mode,
- the third character-based perception facilitating mode,
- the fourth character-based perception facilitating mode,
- the content-significance based perception facilitating mode,
- the first placement-location based perception facilitating mode, and
- the second placement-location based perception facilitating mode.

With the exception of the fourth character-based perception facilitating mode, the second left border indicator element 212 also utilizes these perception facilitating modes, although expressed differently in a couple of cases. In addition, the second left border indicator element 212 also utilizes a second background-differentiated perception facilitating mode wherein visual targeting of a day of the month indicator element 214 is facilitated by an augmented background contrast 216. The augmented background contrast 216 is a faux shadow effect that further distinguishes indicator element 214 and thereby aids visual targeting of the insurance related information within indicator element 214. The faux shadow effect of augmented background contrast 216 is capable of being comprised of a variety of perception facilitating modes, including:

- The second background-differentiated perception facilitating mode wherein the augmented background contrast 216 is comprised of an additional, middle-ground contrast color that differs from both the color of the day of the month indicator element 214 as well as from a background color 218 of the second left border indicator element 212; and
- a photo-active perception facilitating mode wherein the portions of the second left border indicator element 212 that comprise the augmented background contrast 216 provide a response to photonic stimulation beyond that provided by a material that is merely visible by illumination, such as a reflective or scintillation effect, as well as a separate form of response to photons of a particular wavelength such as a material that shines a different color when illuminated by UV radiation.

Second left border indicator element 212 also utilizes the content-allotment perception facilitating mode similarly to the first left border indicator element 118, but contrasts in that the digits of the day of the month indicator element 214 are also included and in that those digits are of greater size than the other insurance related information content of second left border indicator element 212 in a utilization of the third character-based perception facilitating mode. Text field 220 is analogous to text field 118, with a relatively few differences in overall dimensions and layout.

Figure 3:
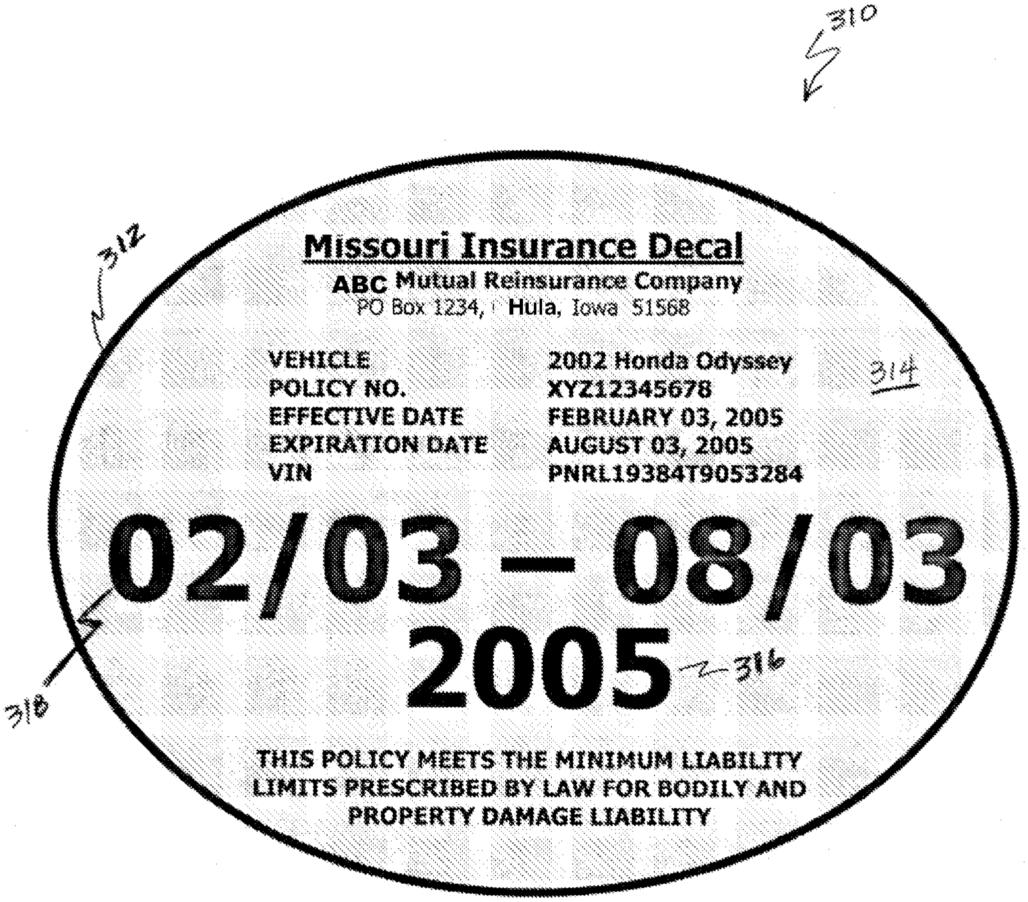
FIG. 3 depicts a third embodiment of a display according to the present invention.

Referring next to FIG. 3, wherein a third display configuration 310 is depicted. The third display configuration 310 differs in several significant manners from the previously described display configurations 110 and 210. The overall shape 312 of the third display configuration 310 is configured as an ellipsoid, a shape that will be known and readily targeted by an observing police officer. The alternative, specified ellipsoid shape of third display configuration 310 is an expression of a shape-based perception facilitating mode, wherein the selected shape of an aspect of a given display configuration facilitates the targeting of at least a part of the insurance related information associated with the shape of that aspect, in the case of third display configuration 310, the applicable aspect is the overall shape itself. While the rectangular shapes of the first and second display configurations 110 and 210 are also utilizations of the shape-based perception facilitating mode, because a rectangular shaped decal is relatively common for other uses (such as a decal indicating a service interval for the vehicle), it is considered to be a less optimal expression of the shape-based perception facilitating mode for the present purposes. In the cases of the first and second (as well as any other) display configuration, the initial targeting of the display will regularly utilize a third placement-location based perception facilitating mode, wherein the location upon the vehicle that the overall display is placed is selected so as to facilitate the observing officers targeting (and hence perceiving) of the display. An example of the third placement-location based perception facilitating mode would be a state regulation requiring that a display be affixed to the lower right or left side of the rear vehicle glass, a requirement that an officer will know in advance so that he/she can readily inspect the display without need to first take time to locate it. Utilization of the third placement-location based perception facilitating mode for the third display configuration 310 will usually be the case also, but the ellipsoid shape 312 expression of the shape-based perception facilitating mode will further facilitate the targeting of the display as well. It should be understood that the ellipsoid shape, in and of itself, is not limiting of the means of expression of the shape-based perception facilitating mode, which can also utilize other shapes, but rather the optimal expression of the shape-based perception facilitating mode is achievable through the use of an overall shape that is both readily recognized and at least somewhat distinctive. In the case of the shape-based perception facilitating mode the previously cited research that found that shapes did not provide a significant effect in facilitating targeting is not applicable, since the present situation is not analogous to locating one particular shape in a group of dozens of potential targets.

The third display configuration 310 presents an alternative layout that does not have the subdivided arrangements of the first and second display configurations 110 and 210, respectively. A single background field 314 encompasses the entire insurance related information containing area of the third display configuration 310. While the background field 314 is depicted as a uniform composition (which can encompass a variety of colors, intensities, optical effects, and other visually perceivable aspects), it is also capable of being presented with gradations and other variations across its extent (not shown). The third display configuration 310 also utilizes:

The first character-based perception facilitating mode by representing, among other ways, the year of the expiration date within numeric indicator element 316 with a portrayal of black digits that contrast with background field 314;

the second character-based perception facilitating mode by representing the effective and expiration dates within numeric indicator element 318 with digits portrayed in a color that contrasts with background field 314;

the content-allotment perception facilitating mode by allotting for inclusion a limited amount of representations of insurance related information;

the third character-based perception facilitating mode by portraying indicator elements 316 and 318 in substantially larger characters than the characters used to represent any other insurance related information within the third display configuration 310;

the first placement-location based perception facilitating mode by placing indicator elements 316 and 318 in a central location that corresponds to the significance of these indicator elements in providing an observing officer with ready perception of the effective and expiration dates of the vehicle's insurance policy;

the second placement-location based perception facilitating mode by placing indicator elements 316 and 318 in a central location that an observing officer has preexisting knowledge of;

the content-significance based perception facilitating mode by selecting to only portray representations of insurance related information that most readily provides the critical dates of the vehicle's insurance policy within indicator elements 316 and 318;

as well as being capable of utilizing the photo-active perception facilitating mode.

Figure 4:
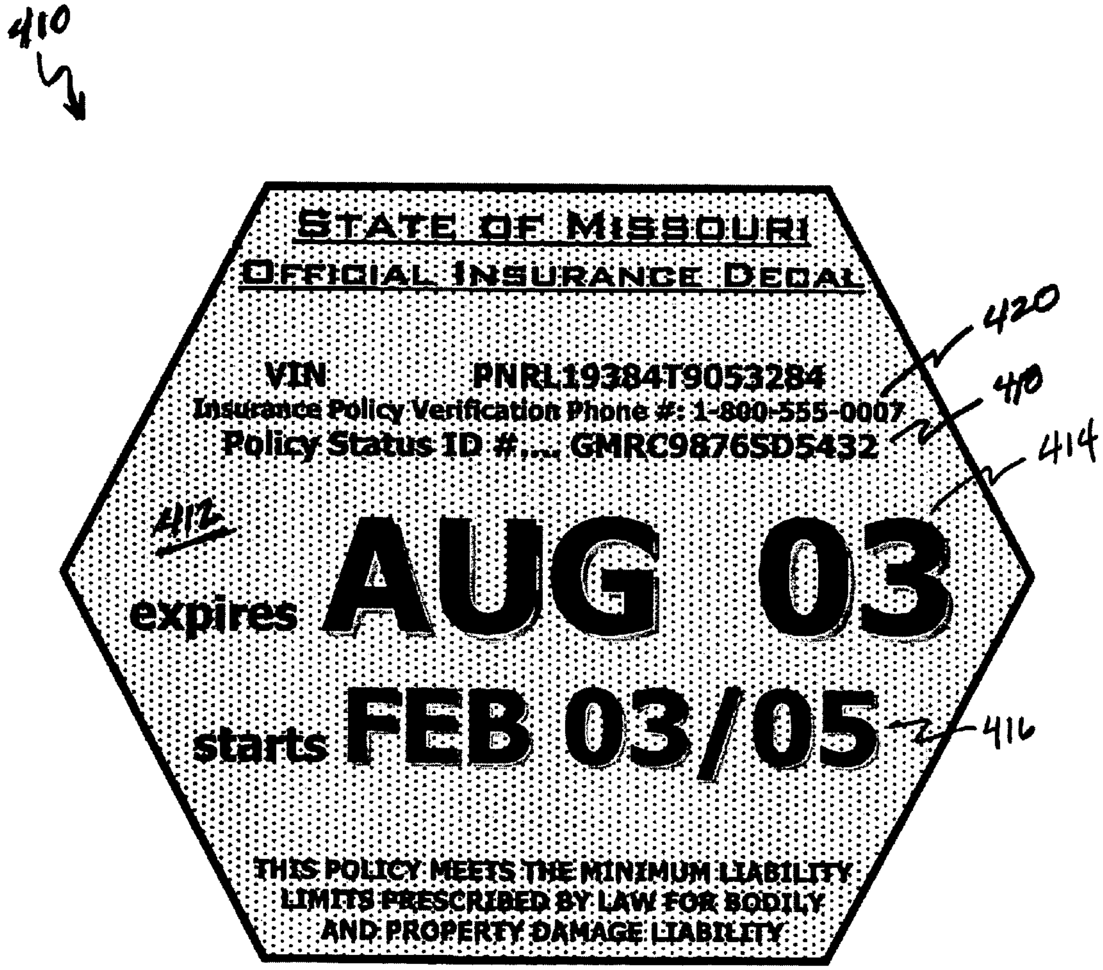
FIG. 4 depicts a fourth embodiment of a display according to the present invention.

Referring now to FIG. 4 which depicts a fourth display configuration 410. The fourth display configuration 410 is more similar to the third display configuration 310 than to either the first or second display configurations 110 and 210, respectively. Fourth display configuration 410 is also an expression of the shape-based perception facilitating mode, in the case of fourth display configuration 410, the applicable aspect again being the overall shape, which is hexagonal in this instance. It is evident that the variety of available shapes within the scope of the present invention are not limited to just rectangles, ellipses, and hexagons, but also encompass virtually any shape that may be deemed useful. In a manner similar to the ellipsoid shape of the third display configuration 310, the hexagonal shape (though chosen for description in part for purposes of illustrative distinction) of the fourth display configuration 410 is also considered to be relatively uncommon and hence provides a more readily targeted form for a display according to the present invention. The fourth display configuration 410 also presents still another alternative layout that does not have the subdivided arrangements of the first and second display configurations 110 and 210, respectively. In addition, the indicator elements of the fourth display configuration 410 are both different in their insurance related information content as well as in their visual portrayals, relative to the first, second, and third display configurations 110, 210, and 310, respectively. Among the differences of the fourth display configuration 410 are the utilization of a patterned background field 412, in an expression of a pattern-based perception facilitating mode. The third display configuration 310 also utilizes the pattern-based perception facilitating mode, in this instance a closely spaced diagonal pin striping, that is so arranged as to present a nearly solid appearance. For the fourth display configuration 410, the pattern is a field of discrete dots that are arranged to be both distinctly visible individually and yet still present a uniform field appearance. The single background pattern field 412 encompasses the entire insurance related information containing area of the fourth display configuration 410. While the background pattern field 412 is depicted as a uniform composition (which can encompass a variety of colors, intensities, optical effects, and other visually perceivable aspects), it is also capable of being presented with gradations and other variations across its extent (not shown). Additional perception facilitating modes that the fourth display configuration 410 utilizes include:

The first character-based perception facilitating mode by representing, among other ways, abbreviated expiration date and effective date indicator elements 414 and 416, respectively, with portrayals of solid black digits that contrast with background pattern field 412;

the content-allotment perception facilitating mode, by allotting for inclusion a limited amount of representations of insurance related information;

the third character-based perception facilitating mode, by portraying indicator elements 414 and 416 in substantially larger characters than the characters used to represent any other insurance related information within the fourth display configuration 410;

the first placement-location based perception facilitating mode, by placing indicator elements 414 and 416 in a central location that corresponds to the significance of these indicator elements in providing an observing officer with ready perception of the effective and expiration dates of the vehicle's insurance policy;

the second placement-location based perception facilitating mode, by placing indicator elements 414 and 416 in relatively central locations that an observing officer has preexisting knowledge of;

the content-significance based perception facilitating mode, by selecting to only portray representations of insurance related information that most readily provides the critical dates of the vehicle's insurance policy within indicator elements 414 and 416;

as well as being capable of utilizing the photo-active perception facilitating mode.

The fourth display configuration 410 contains a different amount and form of insurance related information than do the previously described embodiments of the present invention. The insurance related information in the fourth display configuration 410 that identifies the individual insurance policy and company that issued the policy is a policy status ID #418 and a insurance policy verification phone #420. This alternative configuration for this information is specifically related to the present task of identifying an insurance policy on a publicly viewable space (a vehicle window) that may not be appropriate for displaying the actual policy number, due to privacy issues. This potential concern is addressed by inclusion of the insurance status ID #418, which is individually assigned to the vehicle owner's insurance policy, but does not provide that actual policy number publicly. The insurance policy verification phone number 420 is available specifically for the purpose of verifying and expanding on the insurance related information when called by a law enforcement officer. The ID #418 will identify the related individual insurance policy, and access to this information can be controlled by limiting knowledge of a needed password to only law enforcement officers, or through a similar process. Additionally, as an optional capability, the ID #418 can also be utilized as a means for an individual to at least determine some aspect of the insurance related information pertaining to a given vehicle when no individual connected to that vehicle is present. For example, if a first driver where to scrape a second car when leaving a parking lot and the first driver wanted to do the responsible thing and leave information for the driver of the second car, but the second driver is not present and waiting for the second driver is not practical, the first driver could call the insurance policy verification phone number 420 and leave information pertaining to their identity, their insurance, and the details of the incident which caused the scrape. The insurance policy verification phone number 420 can have a no-password, messaging option wherein the ID#418 can be used to target a message to the owner of the second car, without having to leave a note that may be blown away or make compromising personal information potentially available to prying third party eyes. As an incentive to encourage such responsible behavior, it may be preferable to reach an agreement among insurance companies to provide a benefit for taking this self-reporting action, such as mitigating future insurance rate increases for the first driver due to this accident, in a manner that would decrease costs for the insurance industry as a whole. The variation in content and degree of public revelation of insurance related information is not unique to the fourth display configuration 410, and can also be utilized for any embodiment of the VISDS.

Figure 5:
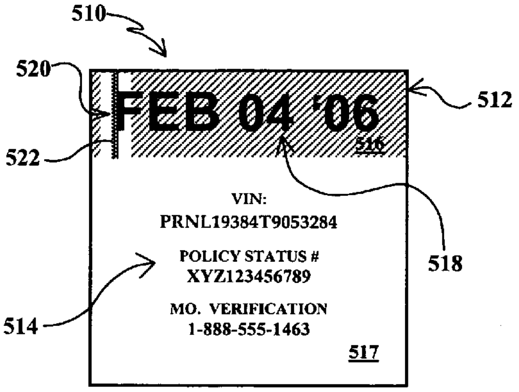
FIG. 5 depicts a first alternative arrangement of a fifth embodiment of a display according to the present invention.

FIGS. 5-8 depict first through fourth variants of a fifth display configuration 610-810, respectively. The variants of the fifth display configuration have certain perception facilitating modes in common, with a limited number of variations in how some aspects of the common perception facilitating modes are implemented. In FIG. 5, the fifth display configuration first variant 510 is a square display of insurance status related information that includes at least a sufficient amount of information required to ascertain the insurance status of a vehicle the fifth display configuration first variant 510 is displayed on. In general, the fifth display configuration first variant 510 will be incorporated into an affixable exhibit for effecting said on-vehicle display, wherein the manner of affixing the exhibit can be chosen form any of a number of well known techniques, such as using a static adhesion plastic sticker of the familiar types used to affix to a vehicle's window parking permit or registration information. The manner of affixing can also incorporate a form of pocket of removable tabs (not shown) that will allow the exhibit to be continuously affixed to the vehicle while also allowing the display of insurance status related information to be replaceable when it becomes necessary to update the insurance status related information. The sufficient amount of insurance status related information is subdivided into insurance status datums that are symbolized with visual signifiers. The symbolizing process utilizes various perception facilitating modes to enhance the readiness of perception of the visual signifiers, which are arranged in the fifth display configuration first variant 510 so as to maintain or augment the enhancement of the readiness of visual perception of the visual signifiers' informational content. The fifth display configuration first variant 510 is generally segregated into a primary insurance related information field 512 and a secondary insurance related information field 514. The four variants of the fifth display configuration utilize the placement location based perception facilitating mode to enhance the readiness of perception of the visual signifiers of the primary insurance related information. A first aspect of the use of the placement location based perception facilitating mode in the fifth display configuration is the locating of the primary insurance related information field 512 in the vicinity of a top border of the fifth display configuration first variant 510. In use, it will be understood by the relevant authorities that the relative location of the primary insurance related information is at least partially indicative of the insurance validity date (i.e. the ending date that the insurance for that vehicle is valid) of the vehicle's insurance policy. In the case of the fifth display configuration, it will be understood that when the primary insurance related information is located along the top border that this location symbolizes that the validity date is within the first quarter of the year indicated, and when the primary insurance related information is located along the right side border that this location symbolizes that the validity date is within the second quarter of the year indicated, and so on continuing clockwise about the border of fifth display configuration.

The fifth display configuration first variant 510 also utilizes the background differentiated perception facilitating mode to enhance the viewer's perception of the location of the primary insurance related information with a shading 516 of at least a portion of the background of the primary insurance related information filed 512, while not shading the background of the secondary insurance related information field 514. In addition to the quarter-year indicating rotation of the primary insurance related information field 512, the shading 516 is also color coded with three differing hues that indicate which month of the quarter-year that the insurance validity date falls within. For example, when the primary insurance related information field 512 indicates the insurance validity date falls within the first quarter of the year such as in the fifth display configuration first variant 510, the first month of the quarter-year, January, is symbolized by the shading 516 having a green hue, and when the insurance validity date falls within the second or third months the hue of the shading 516 would be yellow or red, respectively. By applying the same progression of standard colors corresponding to the progression of months in a given quarter-year for the shading of the other three quarter-years' primary insurance related information fields, an observer is readily able to determine the month of the insurance validity date, for example when the primary insurance related information field is red and is disposed along the lower border of the display, then it is immediately clear that the insurance validity date falls within the month of September. It is thus apparent that the present invention can greatly enhance the readiness of perception of salient aspects of the insurance validity date, since in many cases it will only be necessary to ascertain the month that the insurance validity date falls within in order to determine if the insurance status of the vehicle is permissible. Additionally, a second shading color (not shown) can be applied to the background of the secondary insurance related information field 517 to indicate for ready perception the year of the insurance validity date. The shading of the primary insurance related information filed 512 can also optionally incorporate the pattern based perception facilitating mode by effecting the shading 516 with a visually distinctive pattern. At least one of the character based perception facilitating modes are also utilized to distinguish the primary insurance related information field 512 from the secondary insurance related information field 514, such as utilizing substantially larger and differently configured characters in the primary insurance related information filed 512. By exclusively reserving the border vicinities for the visual signifiers of the primary insurance related information, the fifth display configuration variants also employ the content allotment perception facilitating mode. Although the four variants of the fifth display configuration are shown as each utilizing differing visual signifiers for symbolizing the informational content of the insurance status datums within the primary insurance related information field 512, it should be understood that when in use, a similar arrangement of visual signifiers in the primary insurance related information field 512 will be utilized for all four quarters of the year, with the differences in placement location as shown for the four quarter-years and appropriate, but limited variations in the dispositions of the visual signifiers. The four variants shown characterize four alternative manners of arranging visual signifiers of the primary insurance related information, and when in use generally only one of the variants will be employed, with the relevant modifications to show which applicable quarter-year the insurance validity date falls within. The principal differences between the four variants of the fifth display configuration are in how the insurance datums of the primary insurance related information field 512 are symbolized with visual signifiers. The remainder of the descriptions herein of these four variants will be focused largely on these differences, with any additional differences being detailed where appropriate.

The primary insurance related information field 512 includes a relatively large character based insurance validity date visual signifier 518 for ready perception of the insurance validity date. A shading interruption 520 is an augmenting visual signifier of the location of the a more specific visual signifier: an insurance validity date locator bar 522. The shading interruption can alternatively be configured (all not shown), in addition to the lack of shading shown in FIG. 5, as a shading change in color, hue, or saturation; as a change in shading pattern or an introduction of a pattern where the remainder of the shading 516 has none; or as an introduction of a photo active region such as a fluorescent or reflective background. The location of the insurance validity date locator bar 522, relative to the left and right border edges of the fifth display configuration first variant 510, is also a visual signifier of the insurance validity date. Since the various quarterly primary insurance related information fields rotate about the perimeter of the fifth display configuration first variant 510 in a clockwise fashion, it is natural to designate the closest clockwise edge of each quarter-year's primary insurance related information field as the starting day of the month of the insurance validity date, and the farthest clockwise edge as the ending date of the month of the insurance validity date. In the case of the primary insurance related information field 512, the relative spacing of the shading interruption 520 and the insurance validity date locator bar 522 being much closer to the left (i.e. closest clockwise edge) than to the right (i.e. farthest clockwise edge) border edges symbolically enables the ready perception that the insurance validity date falls close to the beginning of the relevant month, without even a need to read the character based insurance validity date visual signifier 518.

Figure 6:
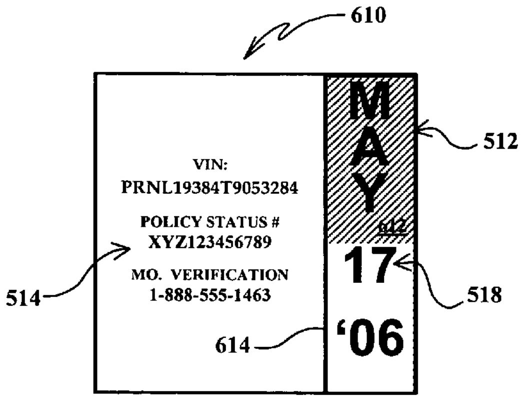
FIG. 6 depicts a second alternative arrangement of a fifth embodiment of a display according to the present invention.

In FIG. 6, the primary insurance related information field 512 is disposed along the right side border of the fifth display configuration second variant 610, symbolically indicating that the insurance validity date falls within the second quarter-year of the year. In the fifth display configuration second variant 610, a partial background shading 612 extends across only a portion of the primary insurance related information field 512, with the relative extent that the partial background shading 612 covers from the closest clockwise edge (i.e. top edge) to the farthest clockwise edge (i.e. bottom edge) symbolically denoting the relative position within the relevant month where the insurance validity date falls. For example, in the case of the fifth display configuration second variant 610, the insurance validity date falls near the midway point in the relevant month of May, and accordingly the partial background shading 612 covers about halfway across the extent of the primary insurance related information field 512. The remainder of the primary insurance related information field 512 can be unshaded as shown, or can be configured with any of other manner of background shading or visual effect that will provide a useable contrast to the partial background shading 612. In the case where the extent of the partial background shading 612 is such that it is possible for it to indicate more than one quarter-year, such as when the partial background shading 612 extends downward only as far as the limit point of the primary insurance related information field 512 in the fifth display configuration first variant 510, the additional inclusion of the character based insurance validity date visual signifier 518 helps to resolve the potential ambiguity. A peripheral frame 614 of the primary insurance related information field 512 further facilitates the readiness of perception of the relevant quarter-year that the insurance validity date falls within.

Figure 7:
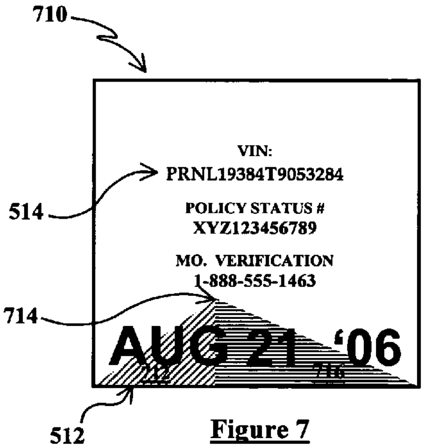
FIG. 7 depicts a third alternative arrangement of a fifth embodiment of a display according to the present invention.
Figure 8:
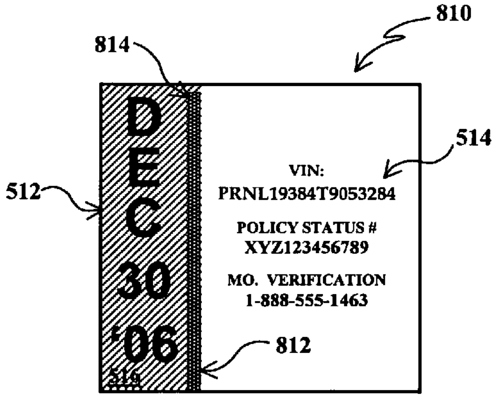
FIG. 8 depicts a fourth alternative arrangement of a fifth embodiment of a display according to the present invention.

In FIG. 7, the primary insurance related information field 512 of the fifth display configuration third variant 710 utilizes background-differentiated, shape based, and placement location based perception facilitating modes to symbolize the insurance validity date. A shaped background first shading 712 is configured in a triangular shape with the relative location of its vertex 714 between the closest clockwise edge (i.e. right edge) and the farthest clockwise edge (i.e. left edge) indicating where in the relevant month that the insurance validity date falls. For example, the vertex 714 being positioned approximately two-thirds of the way towards the farthest clockwise edge denotes that the insurance validity date falls approximately two-thirds of the way through the month of the insurance validity date. An optional, shaped background second shading 716 that substantially differs form the shaped background first shading 712 can also be utilized to further enhance the readiness of perception of the position of the vertex 714, which itself symbolically denotes the day of the month on which the insurance validity date falls. In FIG. 8, the primary insurance related information field 512 is disposed along the left periphery of the fifth display configuration fourth variant 810 and includes the shading 516. A patterned shaft 812 disposed along the internal edge of the primary insurance related information field 512 extends upward from the closest clockwise edge (i.e. bottom edge) towards the farthest clockwise edge (i.e. top edge) of the fifth display configuration fourth variant 810. The relative distance that the patterned shaft 812 extends from the closest to the farthest clockwise edges symbolically denotes the relative position of the day of the month of the insurance validity date. For example, in the case of the fifth display configuration fourth variant 810, the patterned shaft terminus 814 reaches almost to the top edge which symbolically denotes that the insurance validity date (Dec. 30, 2006) falls almost at the end of the month.

Figure 9:
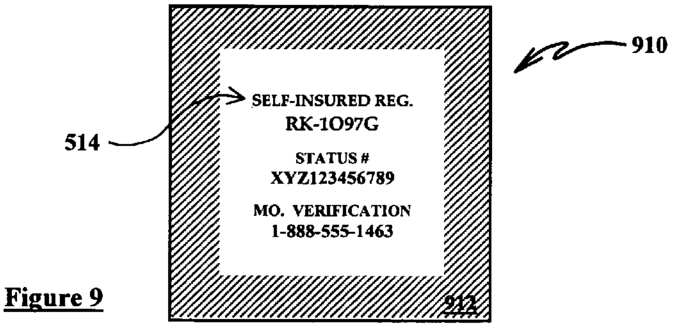
FIG. 9 depicts a sixth embodiment of a display according to the present invention.

FIG. 9 depicts a self-insured display configuration 910 that is arranged in a manner that differs from the other display configurations so as to symbolically denote that the insurance status of the vehicle in question differs from those with the standard forms of insurance. Self-insured vehicles are typically those that are part of a large fleet of vehicles, such as rental cars. For an enterprise that maintains such a large fleet it can become financially advantageous for the owner of the fleet to finance the insurance of the vehicles themselves, and the conditions that such a self-insurer must legally satisfy differ from those of standard vehicle insurance and the insurance status datums of standard vehicles will often not apply to self-insured vehicles. The insurance validity date in particular will not generally apply in the same way to self-insured vehicles, since a fleet owner, for example, will generally be providing self-insurance for its vehicles in an unending fashion. Of course, it may still be necessary to determine if the self insurance is being effected properly, so that the secondary insurance related information field 514 will still be generally be present. The self-insured display configuration 910 symbolically denotes that it is on a self-insured vehicle with the surrounding shaded border 912, that an observer will readily perceive denotes a self-insured vehicle.

Outside of the variations in configuration and perception facilitating modes among the various embodiments of the VISDS, it should also be understood that the particular combinations of content, indicator elements, perception facilitating modes, and other aspects of the VISDS employed by each embodiment are not unique to the individual embodiments. The scope of the present invention encompasses additional alternative embodiments (not shown) that are capable of being configured with differing permutations and combinations of these separate aspects.

In view of the above, it will be seen that the various objects and features of the invention are achieved and other advantageous results obtained. The examples contained herein are merely illustrative and are not intended in a limiting sense.

What is claimed is:

1. A method of displaying information relating to a vehicle's insurance status comprising the steps of:

depicting, in at least one manner prescribed for facilitating perception of said display's informational content by a suitable display perceiver, at least a first and second indicator elements in an affixable exhibit suitable for securing to the vehicle, said first indicator element including at least a first piece of information that relates to an insurance policy for the vehicle, said second indicator element including at least a second piece of information that relates to the insurance policy for the vehicle, said depicting involving selectively portraying said indicator elements in selected perception facilitating modes, said perception facilitating modes providing capabilities of facilitating human perception of said insurance policy related pieces of information, at least a first of said perception facilitating modes being capable of providing a differing degree of perception facilitating than at least a second of said perception facilitating modes, said depicting appearing from the vehicle;

attributing said insurance policy related pieces of information with differing degrees of significance, and determining at least one association between:

(a) at least one of the degrees of significance attributed to at least one of said first and second insurance policy related pieces of information, and (b) at least one of the degrees of perception facilitating provided by at least one of said first and second perception facilitating modes; and selecting one of said first and second perception facilitating modes for portraying said first indicator element and the other of said first and second perception facilitating modes for portraying said second indicator element, said selecting of perception facilitating mode for portraying the indicator elements being made in accordance with at least one of the determined associations between said degrees of significance and said degrees of perception facilitating.

2. A method of displaying information relating to a vehicle's insurance status comprising the steps of:

configuring, in at least one manner prescribed for facilitating perception of said display's informational content by a suitable display perceiver, a display of the information that relates to the status of the vehicle's liability insurance policy in an affixable exhibit suitable for securing to the vehicle, said display apparent from the vehicle and being capable of including a plurality of modes of portraying representations of said insurance status related information;

depicting within said display at least one indicator element, said indicator element including at least one representation of one part of said insurance status related information, said depicting involving portraying said indicator element in at least one visual perception facilitating mode, said visual perception facilitating modes providing differing capabilities, said differing capabilities including varying degrees of facilitating human visual perception of said insurance status related information; and portraying said indicator element in at least a selected one of said visual perception facilitating modes, said selected visual perception facilitating mode providing a differing degree of visual perception facilitating than does the mode of portraying a different part of the display's insurance status related information.

3. A method of indicating a vehicle's insurance status comprising the steps of:

ascertaining an amount of information sufficient to indicate a given vehicle's insurance status, said sufficient amount of information being subdivisible into insurance status datums, each of said insurance status datums denoting at least one aspect of a vehicle's insurance status;

forming an insurance status data set containing at least said sufficient amount of vehicle insurance status indicating information, said insurance status data set including at least one of said insurance status datums;

symbolizing, in at least one manner prescribed for facilitating perception of said display's informational content by a suitable display perceiver, at least a portion of at least one insurance status datum's informational content with at least one visual signifier, said symbolizing involving at least one perception facilitating mode which enhances the readiness of human visual perception of the informational content symbolized by said visual signifier; and representing said insurance status data set with an arrangement of said visual signifiers in an affixable exhibit suitable for securing to the vehicle, said arrangement of the visual signifiers forming a display that appears from the vehicle and enhances the readiness of visual perception of the insurance status data set.

4. The method of indicating a vehicle's insurance status according to claim 3, wherein assorted perception facilitating modes are differentiated by their varying manners of facilitating the readiness of visual perception, at least one of said varying manners of facilitating being selected from a group consisting of:

a) character-based facilitating wherein the visual signifiers include at least one alphanumeric character symbolized in a perception facilitating manner;

b) background-differentiated perception facilitating wherein selected visual signifiers' symbolizing involves specific visual backgrounds, said specific visual backgrounds effecting said facilitating by aiding at least one of locating and comprehending said selected foreground visual signifiers;

c) placement-location based perception facilitating wherein the location in which at least a portion of said visual display is placed facilitates perception of at least one visual signifier within said display, said locations including at least one of differing locations within said display and differing locations on said vehicle;

d) photo-active perception facilitating wherein at least a portion of said display is photonically active in a manner producing a visual effect beyond the mere visible;

e) shape-based perception facilitating wherein at least one of said visual signifiers, a portion of said display, and said display's overall shape is configured in a selected shape;

f) pattern-based perception facilitating wherein at least a portion of said display utilizes a visual pattern, said pattern being an aspect of at least one of a foreground, middle-ground, and background of said patterned display portion;

g) And combinations thereof.

5. The method of indicating a vehicle's insurance status according to claim 3, wherein at least one attribute of a given visual signifier's informational content at least partially influences the perception facilitating mode utilized in symbolizing said visual signifier, said informational content influenced perception facilitating modes being selected from a group consisting of:

a) content-allotment based facilitating wherein specific manners of symbolizing are only allotted to visual signifiers that include at least one specific attribute within their informational content;

b) content-significance based facilitating wherein at least one manner of symbolizing is influenced by a degree of significance of at least one attribute of the visual signifier's informational content;

c) content-priority based facilitating wherein at least one manner of symbolizing is influenced by a relative priority of at least one attribute of the visual signifier's informational content;

d) and combinations thereof.

6. The method of indicating a vehicle's insurance status according to claim 4, wherein at least one attribute of a given visual signifier's informational content at least partially influences which of said varying facilitating manner perception facilitating modes is utilized for symbolizing said given visual signifier, said informational content attributes including at least one of a relative significance and a relative priority of the informational content being symbolized.

7. The method of indicating a vehicle's insurance status according to claim 3, wherein said insurance status data set, in addition to said insurance status indicating information, further includes insurance related information that is non-status indicating, said non-status indicating insurance related information being subdivisible into insurance non-status datums that are also symbolized with at least one visual signifier;

at least one portion of the insurance status indicating information being primary insurance related information and at least one portion of the non-status indicating insurance related information being secondary insurance related information, and said symbolizing of said insurance status datums is not uniform for the entirety of all said insurance status datums and all said insurance non-status datums within said insurance status data set, said symbolizing variations involving variations in utilizing said perception facilitating modes so that perception of at least one visual signifier of said primary insurance status datums is more readily perceived than is at least one visual signifier of said secondary insurance non-status datums.

8. The method of indicating a vehicle's insurance status according to claim 3, wherein said display is incorporated into an affixable exhibit suitable for securing to said vehicle and said method further comprises at least one optional step selected from a group consisting of:

a) affixing said exhibit to the vehicle so that said exhibit's display of visual signifiers is readily visible from the vehicle's exterior;

b) affixing said exhibit to the vehicle in at least one manner prescribed for facilitating perception of said display's informational content by a suitable display perceiver;

c) affixing said exhibit to the vehicle at a vehicle site prescribed for facilitating perception of said display's informational content by a suitable display perceiver;

d) providing said affixable exhibit;

e) and combinations thereof.

9. The method of indicating a vehicle's insurance status according to claim 3, further comprising the step of utilizing said method by at least one of insurance related organizations and insurance businesses.

10. The method of indicating a vehicle's insurance status according to claim 3, further comprising the step of utilizing said method by at least one of an authority and an organization effecting an authorized undertaking.

11. A system for indicating a vehicle's insurance status comprising:

a display of at least one, and generally a plurality of, visual signifiers, each of said visual signifiers symbolizing at least a portion of an insurance status datum's informational content, said insurance status datums being a subdivision of an insurance status data set, said insurance status data set including at least an amount of information sufficient to indicate a vehicle's insurance status, each of said insurance status datums denoting at least one aspect of the vehicle's insurance status;

at least one of the visual signifiers symbolizing involving at least one perception facilitating mode, said perception facilitating modes enhancing a readiness of human visual perception of the informational content symbolized by said at least one visual signifier;

said display apparent from the vehicle and representing the insurance status data set with an arrangement of said visual signifiers, said arrangement of the visual signifiers potentially further enhancing the readiness of visual perception of the insurance status data set.

12. The system for indicating a vehicle's insurance status according to claim 11, wherein assorted perception facilitating modes are differentiated by their varying manners of facilitating the readiness of visual perception, at least one of said varying manners of facilitating being selected from a group consisting of:

a) character-based facilitating wherein the visual signifiers include at least one alphanumeric character symbolized in a perception facilitating manner;

b) background-differentiated perception facilitating wherein selected visual signifiers' symbolizing involves specific visual backgrounds, said specific visual backgrounds effecting said facilitating by aiding at least one of locating and comprehending said selected foreground visual signifiers;

c) placement-location based perception facilitating wherein the location in which at least a portion of said visual display is placed facilitates perception of at least one visual signifier within said display, said locations including at least one of differing locations within said display and differing locations on said vehicle;

d) photo-active perception facilitating wherein at least a portion of said display is photonically active in a manner producing a visual effect beyond the mere visible;

e) shape-based perception facilitating wherein at least one of said visual signifiers, a portion of said display, and said display's overall shape is configured in a selected shape;

f) pattern-based perception facilitating wherein at least a portion of said display utilizes a visual pattern, said pattern being an aspect of at least one of a foreground, middle-ground, and background of said patterned display portion;

g) and combinations thereof.

13. The system for indicating a vehicle's insurance status according to claim 11, wherein at least one attribute of a given visual signifier's informational content at least partially influences the perception facilitating mode utilized in symbolizing said visual signifier, said informational content influenced perception facilitating modes being selected from a group consisting of:

a) content-allotment based facilitating wherein specific manners of symbolizing are only allotted to visual signifiers that include at least one specific attribute within their informational content;

b) content-significance based facilitating wherein at least one manner of symbolizing is influenced by a degree of significance of at least one attribute of the visual signifier's informational content;

c) content-priority based facilitating wherein at least one manner of symbolizing is influenced by a relative priority of at least one attribute of the visual signifier's informational content;

d) and combinations thereof.

14. The system for indicating a vehicle's insurance status according to claim 12, wherein at least one attribute of a given visual signifier's informational content at least partially influences which of said varying facilitating manner perception facilitating modes is utilized for symbolizing said given visual signifier, said informational content attributes including at least one of a relative significance and a relative priority of the informational content being symbolized.

15. The system for indicating a vehicle's insurance status according to claim 11, wherein said insurance status data set, in addition to said insurance status indicating information, further includes insurance related information that is non-status indicating, said non-status indicating insurance related information being subdivisible into insurance non-status datums that are also symbolized with at least one visual signifier;

at least one portion of the insurance status indicating information being primary insurance related information and at least one portion of the non-status indicating insurance related information being secondary insurance related information, and said symbolizing of said insurance status datums is not uniform for the entirety of all said insurance status datums and all said insurance non-status datums within said insurance status data set, said symbolizing variations involving variations in utilizing said perception facilitating modes so that perception of at least one visual signifier of said primary insurance status datums is more readily perceived than is at least one visual signifier of said secondary insurance non-status datums.

16. The system for indicating a vehicle's insurance status according to claim 11, wherein said display is incorporated into an affixable exhibit suitable for securing to said vehicle in a disposition that enables ready perception of the display's visual signifiers from the vehicle's exterior.

17. The system for indicating a vehicle's insurance status according to claim 16, wherein said affixable exhibit incorporates at least an affixing part and a first removable display part, said affixing part providing said vehicle securing capability and said first removable display part incorporating a first version of said visual signifiers of the insurance status datums, said removable part being replaceable with an updated second removable display part that incorporates a second version of the visual signifiers, said second version of the visual signifiers incorporating insurance status data set changes from the insurance status data set incorporated in said first version of the visual signifiers.

18. A system for providing a readily perceivable representation of a vehicle's insurance status comprising:

a display of visual signifiers, said display apparent from a vehicle so as to be visible from said vehicle's exterior, each of said visual signifiers symbolically denoting at least one aspect of the display's informational content and each of said visual signifiers corresponding to at least one datum of information that relates to said vehicle's insurance status, at least one of said visual signifiers' symbolizing being effected in the manner of at least one perception facilitating mode;

said perception facilitating modes being manners of symbolizing representations, said representations utilizing at least one symbolizing technique that enhances the readiness of human perception of the datum of insurance status related information that the visual signifier denotes, said symbolizing techniques involving at least one way of denoting information that does not involve solely presenting said information in generally uniform alphanumeric characters.

19. The system for providing a readily perceivable representation of a vehicle's insurance status according to claim 18, wherein at least one of said perception readiness enhancing symbolizing techniques is selected from a group consisting of:

a) denoting at least one insurance status related informational datum with varying character sizing;

b) denoting at least one insurance status related informational datum with varying character shading;

c) denoting at least one insurance status related informational datum with varying character arrangements;

d) denoting at least one insurance status related informational datum with selected placement locations of at least one selected visual signifier;

e) denoting at least one insurance status related informational datum with selected visual backgrounds for at least one selected visual signifier;

f) denoting at least one insurance status related informational datum with selected shapes for at least one selected visual signifier;

g) denoting at least one insurance status related informational datum with selected patterns for at least one selected visual signifier;

h) denoting at least one insurance status related informational datum with selected photo-active effects for at least one selected visual signifier;

i) denoting at least one insurance status related informational datum with selected visual signifiers being symbolized only with selected forms of representation;

j) denoting at least one insurance status related informational datum with selected visual signifiers that are allotted to said informational datums according to the content of said insurance status related informational datums;

k) denoting at least one insurance status related informational datum with selected visual signifiers that are prioritized according to the priority of said insurance status related informational datums;

l) denoting at least one insurance status related informational datum with selected visual signifiers that are allotted according to the content of said insurance status related informational datums;

m) and combinations thereof.

20. The system for providing a readily perceivable representation of a vehicle's insurance status according to claim 18, further comprising an association that utilizes said vehicle insurance status representations in concert with at least one of an insurance related communication system, an administering insurance related organization, an insurance related business, and a governing authority.

* * * * *